US012116304B2

(12) United States Patent
Shiobara et al.

(10) Patent No.: US 12,116,304 B2
(45) Date of Patent: Oct. 15, 2024

(54) METHOD FOR PACKING QUARTZ GLASS CLOTH

(71) Applicant: Shin-Etsu Chemical Co., Ltd., Tokyo (JP)

(72) Inventors: Toshio Shiobara, Tokyo (JP); Hajime Itokawa, Annaka (JP); Ryunosuke Nomura, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 18/573,215

(22) PCT Filed: Nov. 28, 2023

(86) PCT No.: PCT/JP2023/042494
§ 371 (c)(1),
(2) Date: Dec. 21, 2023

(87) PCT Pub. No.: WO2024/135242
PCT Pub. Date: Jun. 27, 2024

(65) Prior Publication Data
US 2024/0262735 A1   Aug. 8, 2024

(30) Foreign Application Priority Data
Dec. 23, 2022   (JP) ................. 2022-206353

(51) Int. Cl.
| B65B 23/00 | (2006.01) |
| B65B 23/20 | (2006.01) |
| B65B 31/00 | (2006.01) |
| B65D 81/20 | (2006.01) |
| B65D 81/26 | (2006.01) |
| C03B 37/012 | (2006.01) |
| C03C 3/06 | (2006.01) |

(52) U.S. Cl.
CPC ........ *C03B 37/01202* (2013.01); *B65B 23/00* (2013.01); *B65B 23/20* (2013.01); *B65B 31/00* (2013.01); *B65D 81/2069* (2013.01); *B65D 81/2084* (2013.01); *B65D 81/266* (2013.01); *C03C 3/06* (2013.01); *C03B 2201/02* (2013.01)

(58) Field of Classification Search
CPC ......... B65B 23/00; B65B 23/20; B65B 31/00; B65D 81/2069; B65D 81/2084; B65D 81/266
USPC .................................................... 53/400, 434
See application file for complete search history.

(56) References Cited

U.S. PATENT DOCUMENTS

| 5,784,860 A | * | 7/1998 | Fujikawa et al. .... B65D 5/5035 53/434 |
| 2009/0266591 A1 | | 10/2009 | Amou et al. |
| 2012/0073655 A1 | * | 3/2012 | Mori et al. ........ H01L 21/67369 206/524.1 |
| 2021/0395929 A1 | | 12/2021 | Shiobara et al. |

FOREIGN PATENT DOCUMENTS

| JP | 62-268630 A | | 11/1987 | |
| JP | 5-170483 A | | 7/1993 | |
| JP | 2000238712 A | * | 9/2000 | ....... C03B 37/01202 |
| JP | 2006-27702 A | | 2/2006 | |
| JP | 2009-19150 A | | 1/2009 | |
| JP | 2009-263569 A | | 11/2009 | |
| JP | 2014-91782 A | | 5/2014 | |
| JP | 2021-195689 A | | 12/2021 | |
| JP | 2022-98800 A | | 7/2022 | |

OTHER PUBLICATIONS

Office Action for JP Patent Application No. 2022-206353 dated May 2, 2023.

* cited by examiner

*Primary Examiner* — Stephen F. Gerrity
(74) *Attorney, Agent, or Firm* — Birch, Stewart, Kolasch & Birch, LLP

(57) ABSTRACT

A method for packing quartz glass cloth includes the step of packing quartz glass cloth that is at least 99.5 wt % comprised of $SiO_2$ with packaging film to form a package, wherein the package has a volumetric absolute humidity therein of 10.0 $g/m^3$ or less.

28 Claims, No Drawings

METHOD FOR PACKING QUARTZ GLASS CLOTH

TECHNICAL FIELD

The present invention relates to a method for packing quartz glass cloth.

BACKGROUND ART

With the ongoing transition today to 5G and other high-speed communication technologies, there exists a strong desire for printed wiring substrates and antenna substrates that have little transmission loss even when used at high frequencies such as EHF. Remarkable progress is being made toward achieving high-density packaging and ultrathin dimensions in printed wiring substrates for information devices such as smartphones. Patent Documents 1 to 3 describe low-dielectric glass cloths made of, for example, D glass, NE glass or L glass as glass cloths for such printed wiring substrates. The substrate used is typically a laminate produced by impregnating a low-dielectric glass cloth with a thermoplastic resin such as fluoroplastic or polyphenylene ether and also with a thermoset resin such as a low-dielectric epoxy resin or low-dielectric maleimide resin to form prepregs which are then built up in layers and cured under applied heat and pressure.

The transmission loss of signals, as shown by the Edward A. Wolff formula (transmission loss$\propto\sqrt{\varepsilon}\times\tan\delta$), is known to improve for materials having a smaller permittivity ($\varepsilon$) and dielectric loss tangent ($\tan\delta$). Hence, a lower dielectric loss tangent is desired in glass cloth, and so the use of quartz glass has been proposed. In particular, Patent Document 4 discloses a quartz glass cloth which, by way of high-temperature heat treatment and etching treatment, achieves a dielectric loss tangent at 10 GHz of 0.0001.

However, the above-cited technical literature makes no mention of a method for packing such quartz glass cloth.

PRIOR ART DOCUMENTS

Patent Documents

Patent Document 1: JP-A H05-170483
Patent Document 2: JP-A 2009-263569
Patent Document 3: JP-A 2009-019150
Patent Document 4: JP-A 2021-195689

SUMMARY OF INVENTION

Technical Problem

Due to the high purity of quartz glass cloth, water of adsorption readily adheres to the surface of the cloth. As a result, the dielectric loss tangent sometimes fluctuates over time and worsens depending on the form in which the quartz glass cloth is delivered to the user and the packing method. It is therefore an object of the present invention to provide a packing method which keeps the dielectric loss tangent in quartz glass cloth having a low dielectric loss tangent from worsening.

Solution to Problem

In quartz glass cloth that is at least 99.5 wt % comprised of $SiO_2$, a trace amount of Si—OH groups form at the surface regardless of how low the dielectric loss tangent of the quartz glass cloth may be. The Si—OH groups at the surface readily adsorb moisture via hydrogen bonds. We have discovered that the dielectric loss tangent in quartz glass cloth having a low dielectric loss tangent worsens under the influence of outside air and the packing conditions during transport. In order to resolve this problem, we have found that, in a method for packing quartz glass cloth that is at least 99.5 wt % comprised of $SiO_2$ with packaging film, the dielectric loss tangent of quartz glass cloth having a low dielectric loss tangent can be kept from worsening by controlling the absolute humidity within the package.

Accordingly, the invention provides following method for packing quartz glass cloth.

1. A method for packing quartz glass cloth, comprising the step of packing quartz glass cloth that is at least 99.5 wt % comprised of $SiO_2$ with packaging film to form a package, wherein the package has a volumetric absolute humidity therein of 10.0 $g/m^3$ or less.

2. The packing method of 1, wherein the package has a volumetric absolute humidity therein of 5.0 $g/m^3$ or less.

3. A method for packing quartz glass cloth, comprising the step of packing quartz glass cloth that is at least 99.5 wt % comprised of $SiO_2$ with packaging film to form a package, wherein the package has a volumetric absolute humidity therein within 5 minutes just prior to opening of the package, as measured by including a battery-operated thermometer/hygrometer within the packaging film, which is 9.8 $g/m^3$ or less.

4. The packing method of any one of 1 to 3, wherein the packaging film has a water vapor transmission rate at 40° C. and 90% RH of 20 $g/(m^2 \cdot day)$ or less.

5. The packing method of any one of 1 to 4, wherein the packaging film is a film selected from the group consisting of films made of an organic resin such as polyethylene, polypropylene, polyester, nylon (PA), ethylene-vinyl alcohol copolymer or vinylidene chloride, organic resin multilayer films and metallized films.

6. The packing method of any one of 1 to 5, wherein a desiccant is included within the packaging film.

7. The packing method of 6, wherein the desiccant has a maximum moisture absorption at 90% relative humidity of 20 wt % or more.

8. The packing method of 6 or 7, wherein the desiccant is selected from the group consisting of silica gel, bentonite, zeolite, calcium chloride, calcium oxide and phosphorus pentoxide.

9 The packing method of any one of 1 to 8, wherein the volumetric absolute humidity within the packaging film at packing onset is 10.0 $g/m^3$ or less.

10. The packing method of 9, wherein the volumetric absolute humidity within the packaging film at packing onset is 5.0 $g/m^3$ or less.

11. The packing method of any one of 1 to 10, wherein the package contains a gas which is dry air.

12. The packing method of any one of 1 to 10, wherein the package contains a gas which is an inert gas.

13. A method for packing quartz glass cloth, comprising the step of packing quartz glass cloth that is at least 99.5 wt % comprised of $SiO_2$ with packaging film to form a package, wherein the packaging film has a water vapor transmission rate at 40° C. and 90% RH of 20 $g/(m^2 \cdot day)$ or less and includes therein a desiccant.

14. The packing method of any one of 1 to 13, wherein the quartz glass cloth, when removed from the package after being packaged for a period of from 1 day to 3 years, has a dielectric loss tangent at 10 GHz of 0.0005 or less.

Advantageous Effects of Invention

The invention makes it possible to provide a method for packing low-dielectric quartz glass cloth that keeps the dielectric loss tangent of the cloth from worsening.

DESCRIPTION OF EMBODIMENTS

The objects, features and advantages of the invention will become more apparent from the following detailed description.

The method for packing quartz glass cloth according to one aspect of the invention includes the step of packing quartz glass cloth that is at least 99.5 wt % comprised of $SiO_2$ with packaging film to form a package, which package has a volumetric absolute humidity therein of 10.0 $g/m^3$ or less.

The method for packing quartz glass cloth according to another aspect of the invention includes the step of packing quartz glass cloth that is at least 99.5 wt % comprised of $SiO_2$ with packaging film to form a package, which packaging film has a water vapor transmission rate at 40° C. and 90% RH of 20 $g/(m^2 \cdot day)$ or less and includes therein a desiccant.

[Quartz Glass Cloth]

The quartz glass cloth of the invention has a $SiO_2$ content of 99.5 wt % or more. From the standpoint of electrical properties such as dielectric loss tangent and physical properties such as thermal expansion, quartz glass cloth having a $SiO_2$ content of 99.9 wt % or more is preferred. At a $SiO_2$ content below 99.5 wt %, the advantageous effects of the invention cannot be exhibited because the dielectric loss tangent worsens.

The quartz glass cloth of the invention can be fabricated by, for example, melting a quartz glass ingot having a diameter of 50 to 500 mm at between 1,700 to 2,300° C. and taking up the resulting filamentary material to give quartz glass thread having a diameter of 200±100 μm. At a melting temperature within this range, stable drawing of the molten material is possible. Quartz glass filament can be obtained by re-drawing the quartz glass thread to a diameter of 2 to 15 μm using an oxyhydrogen flame at between 1,700 and 2,300° C. A quartz glass strand is produced by gathering between 20 and 400 quartz glass filaments into a bundle. A sizing agent composed chiefly of starch and containing a softener or lubricant to impart functionality is used to gather the strands into a bundle. Quartz glass yarn can be obtained by applying twist to the strands produced above. The twist frequency is preferably from 0.1 to 5.0 turns per 25 mm.

Quartz glass cloth can be manufactured by weaving quartz glass yarn. Weaving methods include, without particular limitation, methods that involve the use of, for example, an air jet loom, water jet loom, rapier loom or shuttle loom. When weaving is carried out with an air jet loom or the like, polyvinyl alcohol (PVA) or starch may be applied as a secondary size to achieve further lubricity. The resulting quartz glass cloth is subjected to fiber-opening treatment in order to increase the resin impregnating ability in subsequent steps. Examples of fiber-opening treatment methods include, without particular limitation, fiber-opening treatment that utilizes ultrasound, treatment that employs a high-pressure, columnar water jet stream, and a method that utilizes a gas-liquid mixture mist having a calibrated gas-water volume ratio. These methods may be selectively used according to the type of quartz glass cloth.

Size remains attached to the surface of the quartz glass cloth obtained above, and so the size is removed by a desizing step. The desizing step may involve cleaning with water or an organic solvent or may be heat cleaning treatment that removes organic matter by combusting it. Heat cleaning treatment is generally used because it can carry out desizing more reliably. This treatment includes methods carried out using a flow-type or batch-type heating oven. Because a flow-type oven rapidly burns off the size all at once at an elevated temperature, drawbacks include a drop in strength in the quartz glass cloth and residual, unburnt size. A batch-type oven that slowly combusts organic matter at between 300° C. and 700° C. is commonly used.

At this time, by heating the quartz glass cloth in dry air having a dew point of 15° C. or below, the SiOH in the quartz glass cloth is prevented from increasing, enabling a glass cloth having an excellent dielectric loss tangent to be obtained. The method for placing the quartz glass cloth in dry air having a dew point of 15° C. or below may entail, for example, introducing dry air produced by a compressor or air dryer into the heating oven. The dew point of the dry air that is introduced is preferably 15° C. (volumetric absolute humidity 12.8 $g/m^3$) or below, more preferably 0° C. (volumetric absolute humidity: 4.85 $g/m^3$) or below, even more preferably −20° C. (volumetric absolute humidity: 1.07 $g/m^3$) or below, and still more preferably −60° C. (volumetric absolute humidity: 0.0193 $g/m^3$) or below. In the heating step within a gas, the equilibrium of the reaction $SiO_2 + H_2O \Leftrightarrow Si-OH$ shifts more to the left the lower the dew point, lowering the dielectric loss tangent of the quartz glass cloth. Although there is no particular limitation on the amount of dry air that is introduced, a range of from 0.5 to 20 times the volume of the drying oven per hour is preferred for sufficiently lowering the dew point within the oven and holding the temperature within the oven constant.

The quartz glass cloth may be in the as desized state, although it is more preferable to then subject the cloth to silane coupling agent treatment and form a silane coupling agent-treated quartz glass cloth because this reduces the number of Si—OH groups at the surface of the cloth.

The silane coupling agent treatment method is not particularly limited, although wet treatment is preferable for fabric-like quartz glass cloth. A known silane coupling agent may be used as the silane coupling agent. Illustrative examples include alkoxysilanes such as trimethylmethoxysilane, trimethylethoxysilane, dimethyldimethoxysilane, dimethyldiethoxysilane, methylphenyldimethoxysilane, methylphenyldiethoxysilane, diphenyldimethoxysilane, diphenyldiethoxysilane, trimethoxysilane, triethoxysilane, methyltrimethoxysilane, methyltriethoxysilane, phenyltrimethoxysilane, phenyltriethoxysilane, phenylmethylvinylethoxysilane, naphthyltrimethoxysilane, naphthyltriethoxysilane, 1,4-bis(methoxydimethylsilyl)benzene, tetramethoxysilane, tetraethoxysilane, n-propyltriethoxysilane, hexyltrimethoxysilane, octyltriethoxysilane, decyltrimethoxysilane and 1,6-bis(trimethoxysilyl)hexane: unsaturated group-containing silane coupling agents such as vinyltrimethoxysilane, vinyltriethoxysilane, p-styryltrimethoxysilane, 3-methacryloxypropyltrimethoxysilane, 3-methacryloxypropyldimethoxysilane, 3-methacryloxypropyltriethoxysilane and 3-methacryloxypropyldiethoxysilane: epoxy group-containing silane coupling agents such as 3-glycidoxypropyltrimethoxysilane, 3-glycidoxypropylmethyldimethoxysilane, 3-glycidoxypropyltriethoxysilane, 3-glycidoxypropylmethyldiethoxysilane, 2-(3,4-epoxycyclohexyl)ethyltrimethoxysilane and 2-(3,4-epoxycyclohexyl)ethylmethyldimethoxysilane: amino group-containing silane coupling agents such as 3-aminopropyltrimethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropylmethyldiethoxysilane, N-phenyl-3-aminopropyltrimethoxysilane, N-(vinylbenzyl)-2-aminoethyl-3-aminopropyltrimethoxysilane and the hydrochloride thereof, and N-(vinylbenzyl)-2-aminoethyl-3-aminopropylmethyldimethoxysilane and the hydrochloride thereof; and also alkoxysilane compounds such as 3-isocyanatopropyltriethoxysilane, tris(trimethoxysilylpropyl) isocyanurate, 3-ureidopropyltriethoxysilane, 3-chloropropyltrimethoxysilane, 3-mercaptopropyltrimethoxysilane, 3-mercaptopropylmethyldimethoxysilane, bis(triethoxysilylpropyl)tetrasulfide and trifluoropropyltrimethoxysilane. One of these may be used alone or two or more may be used in admixture. Of these, one or more selected from the group consisting of 3-aminopropyltrimethoxysilane, N-(2-(aminoethyl)-3-aminopropyltrimethoxysilane and N-phenyl-3-aminopropyltrimethoxysilane may be used.

The silane coupling agent is typically used as a dilute aqueous solution having a concentration of from 0.1 to 5 wt %, although use in a concentration range of from 0.1 to 1 wt % is effective. At this concentration, the silane coupling agent deposits uniformly, effecting a more uniform protective action on the surface of the quartz glass cloth, which not only facilitates handling, but also enables uniform and even coating onto the resin which is used when manufacturing the substrate. Moreover, the deposited amount of silane coupling agent is preferably set so as to be from 0.01 to 0.3 wt % of the quartz glass cloth on which deposition occurs.

[Method for Packing Quartz Glass Cloth]

In this invention, the package interior has a volumetric absolute humidity of 10.0 g/m$^3$ or less. The volumetric absolute humidity is preferably 7.5 g/m$^3$ or less, and more preferably 5.0 g/m$^3$ or less. The volumetric absolute humidity within the package has no particular lower limit and may even be 0 g/m$^3$. Methods for attaining this dry gas range include placing a desiccant within the package or selecting a suitable packaging film. In the present invention, the "volumetric absolute humidity within the package" is the value measured 5 minutes after placing a thermometer/hygrometer probe in the packaging film just after the package is opened, regardless of the storage period, and then resealing the package. In this measurement, the volumetric absolute humidity within the packaging film at the onset of packing, which is the value measured without a storage period, is preferably 10.0 g/m$^3$ or less, and more preferably 5.0 g/m$^3$ or less. In measurement at the onset of packing, the volumetric absolute humidity has no particular lower limit and may be 0 g/m$^3$. When measurement is carried out by including a battery-powered thermometer/hygrometer within the packaging film, the volumetric absolute humidity in the package within 5 minutes just prior to opening of the package (volumetric absolute humidity within package by inclusion of battery-operated thermometer/hygrometer) is preferably 9.8 g/m$^3$ or less, more preferably 7.3 g/m$^3$ or less, and even more preferably 4.9 g/m$^3$ or less. The volumetric absolute humidity measured in this way also has no particular lower limit, and may be 0 g/m$^3$.

The volumetric absolute humidity is computed as follows from the temperature (° C.) and relative humidity (%) that are measured with a thermometer/hygrometer.

[Math. 1]

$$\text{Volumetric absolute humidity}(g/m^3) = \frac{217 \times \left(6.1078 \times 10^{\frac{7.5 \times \text{temperature (° C.)}}{\text{temperature (° C.)} + 237.3}}\right)}{(\text{temperature (° C.)} + 273.15) \times \left(\frac{\text{humidity (\%)}}{100}\right)}$$

Any instrument that can measure temperature and relative humidity may be used as the thermometer/hygrometer, and may even be one capable of measuring the volumetric absolute humidity directly without using the above equation.

[Packaging Film]

To minimize its influence on the dielectric loss tangent, the packaging film for packing quartz glass cloth is preferably a film having a water vapor transmission rate at 40° C. and 90% RH of 20 g/(m$^2$·day) or less. The water vapor transmission rate is more preferably 10 g/(m$^2$·day) or less, and even more preferably 5 g/(m$^2$·day) or less. The water vapor transmission rate has no particular lower limit, and may even be 0 g/(m$^2$·day). The water vapor transmission rate is measured by the method described in JIS Z 0208-1976.

As for the packaging film base material, the packaging film is exemplified by films made of an organic resin such as polyethylene (PE), polypropylene (PP), polyester (PET), nylon (PA), ethylene-vinyl alcohol copolymer (EVOH) or vinylidene chloride (PVDC); organic resin multilayer films of PET or NA coated with PVCD; and metallized films of PP or PET vapor-deposited with alumina or silica. Of these, a film selected from among polyethylene films, polypropylene films, nylon films, ethylene-vinyl alcohol copolymer films, organic resin multilayer films and metallized films is preferred. Compared with organic resin single-layer films, organic resin multilayer films have low water vapor transmission rates: metallized films have the lowest water vapor transmission rates of all. The most suitable packaging film is selected according to the environment and period for which the quartz glass cloth is to be held after packing. In this invention, when a desiccant is placed in the pack, an organic resin film may be used.

[Desiccant]

The desiccant that removes moisture within the air in contact with the packed quartz glass cloth and prevents worsening of the dielectric loss tangent is not particularly limited. One type may be used alone or two or more may be used in combination. Examples include silica gel, bentonite, zeolite, calcium chloride, calcium oxide, phosphorus pentoxide, synthetic zeolite and clay. Of these, silica gel, bentonite, zeolite, calcium chloride, calcium oxide and phosphorus pentoxide are preferred. Silica gel, bentonite, zeolite and calcium chloride are more preferred. The desiccant has a maximum moisture absorption at 90% relative humidity of preferably 20 wt % or more, more preferably 50 wt % or more, and even more preferably 100 wt % or more. Moisture absorption is measured by the method described in JIS Z 0701-1977. The desiccant may be used in any amount, provided the amount is suitably selected such that the absolute moisture within the package becomes 10.0 g/m$^3$ or less.

The interior of the package is not particularly limited so long as it has the above volumetric absolute moisture: the gas within the package is exemplified by air and by inert gases such as nitrogen and argon. Of these, from the standpoint of production efficiency, dry air is preferred. The apparatus for producing such dry air may be, for example, a compressor or an air dryer.

The method for packing quartz glass cloth is a method that involves packing quartz glass cloth that is at least 99.5 wt % comprised of $SiO_2$ with a packaging film. The package interior is not particularly limited, so long as it is a gas having a volumetric absolute humidity of 10.0 g/m³ or less. A specific example of a preferred method involves packing 1,000 m or 2,000 m, of quartz glass cloth wound onto a paper tube having a width of 1,270 mm with packaging film having a water vapor transmission rate at 40° C. and 90% RH of 20 g/(m²·day) or less, including a desiccant within the package, and packing and storing in dry air obtained by setting the air within the package to a volumetric absolute humidity of 5.0 g/m³ or less. Packing in which the package interior is sealed with dry air having a dew point of 0° C. or less is more preferred.

The above method keeps the dielectric loss tangent of the quartz glass cloth from worsening. The width and length of the quartz glass cloth are adjusted according to the subsequent steps and are not limited to a width of 1,300 mm and a length of 1,000 m or 2,000 m. By way of illustration, the width may be suitably selected from a range of, for example, 400 to 650 mm or from a range of, for example, 800 to 1,300 mm.

The form of the package is not particularly limited, although it is preferable to pack the quartz glass cloth in a bag or film made of the above packaging film and then heat seal both ends to create an airtight system. The environment/atmosphere during packing is preferably a low-humidity atmosphere. For example, the volumetric absolute humidity is preferably 10.0 g/m³ or less, more preferably 7.5 g/m³ or less, and even more preferably 5.0 g/m³ or less. During packing, air within the package may be replaced with dry air from which moisture has been removed beforehand with an air dryer or the like, or with an inert gas such as nitrogen or argon that has a very low volumetric absolute humidity.

The packing (storage) period is not particularly limited and may be suitably selected according to the intended purpose from a length of one day to three years, such as from 3 to 10 days, or from 1 to 12 months. As for the storage environment/atmosphere, the low-humidity atmosphere also is not particularly limited, although from the standpoint of keeping the volumetric absolute humidity within the package low, the dew point is preferably 25° C. or less, more preferably 20° C. or less, even more preferably 15° C. or less, and still more preferably 10° C. or less.

[Dielectric Loss Tangent of Quartz Glass Cloth at 10 GHz]

After being packed by the inventive packing method, the quartz glass cloth has a dielectric loss tangent at 10 GHz which is preferably 0.00050 or less, and more preferably 0.00035 or less. The packing method of the invention enables the dielectric loss tangent of the quartz glass cloth at 10 GHz to be set to 0.00050 or less. With this packing method, the dielectric loss tangent is the dielectric loss tangent inherent to the quartz glass cloth from which adsorbed water has been substantially removed, enabling the influence of adsorbed water on the dielectric loss tangent to be eliminated. The dielectric loss tangent of quartz glass cloth at 10 GHz is measured using a resonator, such as a cavity resonator from AET, Inc. (TE011 mode).

The thickness of the glass cloth is measured using the theoretical film thickness. The theoretical film thickness of glass cloth is computed as follows:

Theoretical film thickness $t$(μm)=basis weight (g/m²)/specific gravity (g/cm³)

Details are provided in the method described in the Examples section below.

[Ratio of Dielectric Loss Tangents before and after Storage]

The ratio of the dielectric loss tangent at 10 GHz of quartz glass cloth stored by the storage method in this method to the dielectric loss tangent before storage is preferably 1.5 fold or less, more preferably 1.3 fold or less, and even more preferably 1.0 fold or less.

An additional aspect of the invention relates to a method for packing quartz glass cloth that is at least 99.5 wt % comprised of $SiO_2$ in packaging film, wherein the packaging film has a water vapor transmission rate at 40° C. and 90% RH of 20 g/(m²·day) or less and includes therein a desiccant. In this aspect of the invention, suitable materials, amounts and the like are the same as described above.

EXAMPLES

The invention is illustrated more fully below by way of Examples and Comparative Examples, although the invention is not limited by these Examples.

A quartz glass ingot that was at least 99.9 wt % comprised of $SiO_2$ was hot drawn, producing quartz glass fibers consisting of 5.3 μm diameter quartz glass filaments. A quartz glass fiber size (3.0 wt % starch, 0.5 wt % beef tallow and 0.1 wt % emulsifier, with water as the balance) was applied thereto with an applicator, following which the filaments were collected together with a fiber-collecting device and taken up, producing quartz glass strand having a quartz glass filament count of 200. A twist of 24 T/m was applied to the resulting glass strand, thereby producing quartz glass yarn.

An aqueous solution containing 1.5 wt % of a partially saponified product of polyvinyl acetate and 1.5 wt % of starch was applied as a secondary size to the resulting quartz glass yarn, following which quartz glass cloth according to IPC standard 1078 was manufactured on an air jet loom and fiber-opening treatment was carried out with a gas-liquid mixture mist. Using an electric oven (B80×85×200-3Z12-10) from NEMS Co., Ltd., the quartz glass cloth was then heated at 500° C. for 36 hours to remove the size, giving a desized quartz glass cloth. Heating was carried out at this time in a dry state by delivering dry air having a dew point of −70° C. produced by the SHD 3025 Super Heatless Air Dryer from CKD KK in an amount that was 10 times the volume of the electric oven per hour. The surface of the resulting desized quartz glass cloth was treated with 3-methacryloxypropyltrimethoxysilane (KBM-503, from Shin-Etsu Chemical Co., Ltd.) to a percent deposition of 0.05 wt %, giving a silane-treated quartz glass cloth. This quartz glass cloth had a dielectric loss tangent (10 GHz) of 0.00035.

Example 1

A 1,000 m length of the quartz glass cloth having a width of 1,270 mm produced in the Preparation Example was wound onto a paper tube having an inner diameter of 76.5 mm, an outer diameter of 182.6 mm and a width of 1,320 mm, and the resulting quartz glass cloth roll was furnished for use. This roll was packed in a high-density polyethylene (water vapor transmission rate at 40° C./90% RH, 5.0 g/(m²·day)) packaging bag (surface area, 2.8 m²), and a single 100 g packet of nonwoven fabric-packaged A-type silica gel (from Nippon Kako-Kizai Co., Ltd.) having a maximum moisture absorption at 90% relative humidity of 30 wt % was placed within the package. The volumetric absolute humidity measured at this time (packing onset) with an AD-5696 thermometer/hygrometer from A&D Co., Ltd. within the packaging (film) was 7.2 g/m³. The packed quartz glass cloth was stored 30 days in air having a dew point of 24° C. Following storage, the packaging film was opened and an AD-5696 thermometer/hygrometer from A&D Co., Ltd. was placed therein within 30 seconds, following which the package was again tightly closed. The volumetric absolute humidity was 8.0 g/m$^3$. The dielectric loss tangent (10 GHz) was 0.00050.

Example 2

A 1,000 m length of the quartz glass cloth having a width of 1,270 mm produced in the Preparation Example was wound onto a paper tube having an inner diameter of 76.5 mm, an outer diameter of 182.6 mm and a width of 1,320 mm, and the resulting quartz glass cloth roll was furnished for use. This roll was packed in a high-density polyethylene (water vapor transmission rate at 40° C./90% RH, 5.0 g/(m$^2$·day)) packaging bag (surface area, 2.8 m$^2$), and a single 100 g packet of nonwoven fabric-packaged A-type silica gel (from Nippon Kako-Kizai Co., Ltd.) was placed within the package. The volumetric absolute humidity measured at this time (packing onset) within the packaging (film) was 7.2 g/m$^3$. The packed quartz glass cloth was stored 30 days in air having a dew point of 24° C. An AD-5696 thermometer/hygrometer from A&D Co., Ltd. was included at this time in the package together with the glass cloth. After 30 days, the thermometer/hygrometer record was checked, whereupon the volumetric absolute humidity within the packaging just prior to opening the package was 7.8 g/m$^3$. The dielectric loss tangent (10 GHz) was 0.00050.

Example 3

A quartz glass cloth roll produced in the same way as in Example 1 was packed in a high-density polyethylene (water vapor transmission rate at 40° C./90% RH, 5.0 g/(m$^2$·day)) packaging bag (surface area, 2.8 m$^2$), and three 200 g packets of nonwoven fabric-packaged A-type silica gel (from Nippon Kako-Kizai Co., Ltd.) were placed within the package in the same way as in Example 1. The volumetric absolute humidity measured at this time within the packaging film was 7.2 g/m$^3$. The packed quartz glass cloth was stored 30 days in air having a dew point of 24° C. The absolute humidity within the packaging film measured in the same way as in Example 1 was 4.8 g/m$^3$. The dielectric loss tangent (10 GHz) was 0.00040.

Example 4

A quartz glass cloth roll produced in the same way as in Example 1 was packed in an organic resin multilayer film of polypropylene coated with vinyl acetate (water vapor transmission rate at 40° C./90% RH, 1.9 g/(m$^2$·day)) packaging bag (surface area, 2.8 m$^2$), and three 200 g packets of nonwoven fabric-packaged A-type silica gel (from Nippon Kako-Kizai Co., Ltd.) were placed within the package in the same way as in Example 1. The volumetric absolute humidity measured at this time within the packaging film was 7.2 g/m$^3$.

The packed quartz glass cloth was stored 30 days in air having a dew point of 24° C. The volumetric absolute humidity within the packaging film measured in the same way as in Example 1 was 2.6 g/m$^3$. The dielectric loss tangent (10 GHz) was 0.00035.

Example 5

A quartz glass cloth roll produced in the same way as in Example 1 was packed in a metallized film (obtained by vapor-depositing silica on polyester (PET): water vapor transmission rate at 40° C./90% RH, 1.0 g/(m$^2$·day)) packaging bag (surface area, 2.8 m$^2$), and three 200 g packets of nonwoven fabric-packaged A-type silica gel (from Nippon Kako-Kizai Co., Ltd.) were placed within the package in the same way as in Example 1. At this time, the volumetric absolute humidity within the packaging film was 7.2 g/m$^3$. The packed quartz glass cloth was stored 30 days in air having a dew point of 24° C. The volumetric absolute humidity within the packaging film measured in the same way as in Example 1 was 2.1 g/m$^3$. The dielectric loss tangent (10 GHz) was 0.00030.

Example 6

In a quartz glass cloth roll package obtained in the same way as in Example 5, six 100 g packets of the nonwoven fabric-packaged clay-type desiccant Desiclay from Tokai Chemical Industry Co., Ltd. having a maximum moisture absorption of 30 wt % at 90% relative humidity were placed in the package. The volumetric absolute humidity measured at this time within the packaging film was 7.2 g/m$^3$. The packed quartz glass cloth was stored 30 days in air having a dew point of 24° C. The volumetric absolute humidity within the packaging film measured in the same way as in Example 1 was 2.1 g/m$^3$. The dielectric loss tangent (10 GHz) was 0.00030.

Example 7

In a quartz glass cloth roll package obtained in the same way as in Example 5, a single 100 g packet of calcium chloride-based Power Sorb-CE from Fujigel Sangyo Ltd. having a maximum moisture absorption of 400 wt % at 90% relative humidity was placed in the package. At this time, the volumetric absolute humidity within the packaging film was 7.2 g/m$^3$. The packed quartz glass cloth was stored 30 days in air having a dew point of 24° C. The volumetric absolute humidity within the packaging film measured in the same way as in Example 1 was 1.8 g/m$^3$. The dielectric loss tangent (10 GHz) was 0.00030.

Example 8

In a quartz glass cloth roll package obtained in the same way as in Example 5, a single 200 g packet of nonwoven fabric-packaged A-type silica gel from Nippon Kako-Kizai Co., Ltd. was placed within the package. At this time, the volumetric absolute humidity within the packaging film was 7.2 g/m$^3$. The packed quartz glass cloth was stored 30 days in air having a dew point of 24° C. The volumetric absolute humidity within the packaging film measured in the same way as in Example 1 was 2.4 g/m$^3$. The dielectric loss tangent (10 GHz) was 0.00040.

Example 9

A quartz glass cloth roll package obtained in the same way as in Example 1 was packed in high-density polyethylene in the same way as in Example 1, and a single 200 g packet of nonwoven fabric-packaged A-type silica gel from Nippon Kako-Kizai Co., Ltd. was placed within the package. At this time, the volumetric absolute humidity within the packaging film was 7.2 g/m$^3$. The packed quartz glass cloth was stored 7 days in air having a dew point of 24° C. The volumetric absolute humidity within the packaging film measured in the same way as in Example 1 was 3.2 g/m³. The dielectric loss tangent (10 GHz) was 0.00050.

Example 10

In a quartz glass cloth roll package obtained in the same way as in Example 4, air within the packaging film during packing was replaced with dry air produced using the POD-15VNP inverter package oil-free Bebicon air compressor (Hitachi). The volumetric absolute humidity within the packaging film was 1.2 g/m³. The packed quartz glass cloth was stored 30 days in air having a dew point of 24° C. The volumetric absolute humidity within the packaging film measured in the same way as in Example 1 was 1.8 g/m³. The dielectric loss tangent (10 GHz) was 0.00030.

Example 11

In a quartz glass cloth roll package obtained in the same way as in Example 4, air within the packaging film during packing was replaced with nitrogen gas from Tomoe Shokai Co., Ltd. (volumetric absolute humidity, <0.1 g/m³). At this time, the volumetric absolute humidity within the packaging film was less than 0.1 g/m³. The packed quartz glass cloth was stored 30 days in air having a dew point of 24° C. The volumetric absolute humidity within the packaging film measured in the same way as in Example 1 was 1.5 g/m³. The dielectric loss tangent (10 GHz) was 0.00030.

Comparative Example 1

Aside from using vinyl acetate (water vapor transmission rate at 40° C./90% RH, 1.9 g/(m²·day)) instead of the high-density polyethylene in Example 1, a quartz glass cloth roll produced in the same way as in Example 1 was packed and stored after similarly including A-type silica gel within the package. The packed quartz glass cloth was stored 30 days in air having a dew point of 24° C. The volumetric absolute humidity within the packaging film measured in the same way as in Example 1 was 12.3 g/m³. The dielectric loss tangent (10 GHz) was 0.00070.

Comparative Example 2

A quartz glass cloth roll produced in the same way as in Example 1 was packed with high-density polyethylene in the same way as in Example 1. Aside from not including silica gel within the package, storage was carried out in the same way as in Example 1. The volumetric absolute humidity within the packaging film measured in the same way as in Example 1 was 21.8 g/m³. The dielectric loss tangent (10 GHz) was 0.00110.

Owing to packaging materials made of the low water vapor transmission films of the invention and to desiccant present within the package, the dielectric loss tangent of a low-dielectric quartz glass cloth can be kept from worsening due to humidity within the quartz glass cloth.

TABLE 1

|  | Example 1 | Example 2 | Example 3 | Example 4 | Example 5 | Example 6 |
|---|---|---|---|---|---|---|
| Water vapor transmission rate (40° C./90% RH) of packaging material (g/(m² · day)) | 5.0 | 5.0 | 5.0 | 1.9 | 1.0 | 1.0 |
| Maximum moisture absorption of desiccant (wt %) | 30 | 30 | 30 | 30 | 30 | 30 |
| Amount of desiccant included in package (g) | 100 | 100 | 600 | 600 | 600 | 600 |
| Gas within package | air | air | air | air | air | air |
| Volumetric absolute humidity within package at onset (g/m³) | 7.2 | 7.2 | 7.2 | 7.2 | 7.2 | 7.2 |
| Storage atmosphere/conditions: dew point temperature (° C.)/time (days) | 24/30 | 24/30 | 24/30 | 24/30 | 24/30 | 24/30 |
| Volumetric absolute humidity within package after storage (g/m³) | 8.0 | 7.8 (Enclosed) | 4.8 | 2.6 | 2.1 | 2.1 |
| Dielectric loss tangent (10 GHz) before storage (before packing) | 0.00035 | 0.00035 | 0.00035 | 0.00035 | 0.00035 | 0.00035 |
| Dielectric loss tangent (10 GHz) after storage (after packing) | 0.00050 | 0.00050 | 0.00040 | 0.00035 | 0.00030 | 0.00030 |
| Ratio of dielectric loss tangent before and after storage | 1.4 | 1.4 | 1.1 | 1.0 | 0.9 | 0.9 |

TABLE 2

|  | Example 7 | Example 8 | Example 9 | Example 10 | Example 11 | Comp. Example 1 | Comp. Example 2 |
|---|---|---|---|---|---|---|---|
| Water vapor transmission rate (40° C./90% RH) of packaging material (g/(m² · day)) | 1.0 | 1.0 | 5.0 | 1.0 | 1.0 | 150 | 5.0 |
| Maximum moisture absorption of desiccant (wt %) | 400 | 30 | 30 | 30 | 30 | 30 | 30 |
| Amount of desiccant included in package (g) | 100 | 200 | 200 | 600 | 600 | 600 | 0 |
| Gas within package | air | air | air | air | N2 | air | air |
| Volumetric absolute humidity within package at onset (g/m³) | 7.2 | 7.2 | 7.2 | 1.2 | <0.1 | 7.2 | 7.2 |
| Storage atmosphere/conditions: dew point temperature (° C.)/time (days) | 24/30 | 24/30 | 24/7 | 24/30 | 24/30 | 24/30 | 24/30 |
| Volumetric absolute humidity within package after storage (g/m³) | 1.8 | 2.4 | 3.2 | 1.8 | 1.5 | 12.3 | 21.8 |

TABLE 2-continued

|  | Example 7 | Example 8 | Example 9 | Example 10 | Example 11 | Comp. Example 1 | Comp. Example 2 |
|---|---|---|---|---|---|---|---|
| Dielectric loss tangent (10 GHz) before storage (before packing) | 0.00035 | 0.00035 | 0.00035 | 0.00035 | 0.00035 | 0.00035 | 0.00035 |
| Dielectric loss tangent (10 GHz) after storage (after packing) | 0.00030 | 0.00040 | 0.00050 | 0.00030 | 0.00030 | 0.00070 | 0.00110 |
| Ratio of dielectric loss tangent ratio before and after storage | 0.9 | 1.1 | 1.4 | 0.9 | 0.9 | 2.0 | 3.1 |

The measurement methods are described below.

1. Measurement of the "volumetric absolute humidity within the package" was carried out by placing a thermometer/hygrometer probe in the packaging film within 30 seconds just after opening the package, regardless of the storage period, and then resealing the package. The value 5 minutes after resealing was treated as the volumetric absolute humidity.

In Example 2, wherein a battery-powered thermometer/hygrometer is included within the packaging film and continuous measurement is carried out, the recording frequency is set to every 5 minutes and the volumetric absolute humidity within 5 minutes just prior to opening the package is treated as the "volumetric absolute humidity within a package as determined by including in the package a battery-powered thermometer/hygrometer." Measurement at the onset of packing is the value measured without a storage period in the above-described measurement.

The volumetric absolute humidity is measured with a thermometer/hygrometer, and is calculated from the temperature (° C.) and relative humidity (%) using the following formula.

[Math. 2]

$$\text{Volumetric absolute humidity}(g/m^3) = \frac{217 \times \left(6.1078 \times 10^{\frac{7.5 \times \text{temperature (° C.)}}{\text{temperature (° C.)} + 237.3}}\right)}{(\text{temperature (° C.)} + 273.15) \times \left(\frac{\text{humidity (\%)}}{100}\right)}$$

2. The water vapor transmission rate at 40° C./90% RH was measured by the method described in JIS Z 0208-1976.

3. Measurement of Maximum Moisture Absorption by Desiccant Measurement was carried out under the 90% relative humidity conditions described in JIS Z 0701-1977.

4. Dielectric Loss Tangent

The dielectric loss tangent of the glass cloth at 10 GHz and 40 GHz was measured using a cavity resonator from AET, Inc. (TE011 mode). The thickness of the glass cloth was measured using the theoretical film thickness. The theoretical film thickness of glass cloth was computed as follows:

Theoretical film thickness $t(\mu m)$=basis weight $(g/m^2)$/specific gravity $(g/cm^3)$ 5. Change in Dielectric Loss Tangent Dielectric loss tangent ratio=dielectric loss tangent of quartz glass cloth following storage/dielectric loss tangent of quartz glass cloth before storage.

The invention claimed is:

1. A method for packing quartz glass cloth, comprising the step of packing quartz glass cloth that is at least 99.5 wt % comprised of $SiO_2$ with packaging film to form a package, wherein the package has a volumetric absolute humidity therein of 10.0 $g/m^3$ or less.

2. The packing method of claim 1, wherein the package has a volumetric absolute humidity therein of 5.0 $g/m^3$ or less.

3. The packing method of claim 1, wherein the packaging film has a water vapor transmission rate at 40° C. and 90% RH of 20 $g/(m^2 \cdot day)$ or less.

4. The packing method of claim 1, wherein the packaging film is a film selected from the group consisting of films made of an organic resin such as polyethylene, polypropylene, polyester, nylon (PA), ethylene-vinyl alcohol copolymer or vinylidene chloride, organic resin multilayer films and metallized films.

5. The packing method of claim 1, wherein a desiccant is included within the packaging film.

6. The packing method of claim 5, wherein the desiccant has a maximum moisture absorption at 90% relative humidity of 20 wt % or more.

7. The packing method of claim 5, wherein the desiccant is selected from the group consisting of silica gel, bentonite, zeolite, calcium chloride, calcium oxide and phosphorus pentoxide.

8. The packing method of claim 1, wherein the volumetric absolute humidity within the packaging film at packing onset is 10.0 $g/m^3$ or less.

9. The packing method of claim 8, wherein the volumetric absolute humidity within the packaging film at packing onset is 5.0 $g/m^3$ or less.

10. The packing method of claim 1, wherein the package contains a gas which is dry air.

11. The packing method of claim 1, wherein the package contains a gas which is an inert gas.

12. The packing method of claim 1 wherein the quartz glass cloth, when removed from the package after being packaged for a period of from 1 day to 3 years, has a dielectric loss tangent at 10 GHz of 0.0005 or less.

13. The packing method of claim 1, wherein the quartz glass cloth that is at least 99.5 wt % comprised of $SiO_2$ is a silane coupling agent-treated quartz glass cloth that is at least 99.5 wt % comprised of $SiO_2$.

14. A method for packing quartz glass cloth, comprising the step of packing quartz glass cloth that is at least 99.5 wt % comprised of $SiO_2$ with packaging film to form a package, wherein the package has a volumetric absolute humidity therein within 5 minutes just prior to opening of the package, as measured by including a battery-operated thermometer/hygrometer within the packaging film, which is 9.8 $g/m^3$ or less.

15. The packing method of claim 14, wherein the packaging film has a water vapor transmission rate at 40° C. and 90% RH of 20 $g/(m^2 \cdot day)$ or less.

16. The packing method of claim 14, wherein the packaging film is a film selected from the group consisting of films made of an organic resin such as polyethylene, polypropylene, polyester, nylon (PA), ethylene-vinyl alcohol copolymer or vinylidene chloride, organic resin multilayer films and metallized films.

17. The packing method of claim 14, wherein a desiccant is included within the packaging film.

18. The packing method of claim 17, wherein the desiccant has a maximum moisture absorption at 90% relative humidity of 20 wt % or more.

19. The packing method of claim 17, wherein the desiccant is selected from the group consisting of silica gel, bentonite, zeolite, calcium chloride, calcium oxide and phosphorus pentoxide.

20. The packing method of claim 14, wherein the volumetric absolute humidity within the packaging film at packing onset is 10.0 g/m$^3$ or less.

21. The packing method of claim 20, wherein the volumetric absolute humidity within the packaging film at packing onset is 5.0 g/m$^3$ or less.

22. The packing method of claim 14, wherein the package contains a gas which is dry air.

23. The packing method of claim 14, wherein the package contains a gas which is an inert gas.

24. The packing method of claim 14 wherein the quartz glass cloth, when removed from the package after being packaged for a period of from 1 day to 3 years, has a dielectric loss tangent at 10 GHz of 0.0005 or less.

25. The packing method of claim 14, wherein the quartz glass cloth that is at least 99.5 wt % comprised of $SiO_2$ is a silane coupling agent-treated quartz glass cloth that is at least 99.5 wt % comprised of $SiO_2$.

26. A method for packing quartz glass cloth, comprising the step of packing quartz glass cloth that is at least 99.5 wt % comprised of $SiO_2$ with packaging film to form a package, wherein the packaging film has a water vapor transmission rate at 40° C. and 90% RH of 20 g/(m$^2$·day) or less and includes therein a desiccant.

27. The packing method of claim 26 wherein the quartz glass cloth, when removed from the package after being packaged for a period of from 1 day to 3 years, has a dielectric loss tangent at 10 GHz of 0.0005 or less.

28. The packing method of claim 26, wherein the quartz glass cloth that is at least 99.5 wt % comprised of $SiO_2$ is a silane coupling agent-treated quartz glass cloth that is at least 99.5 wt % comprised of $SiO_2$.

\* \* \* \* \*